UNITED STATES PATENT OFFICE.

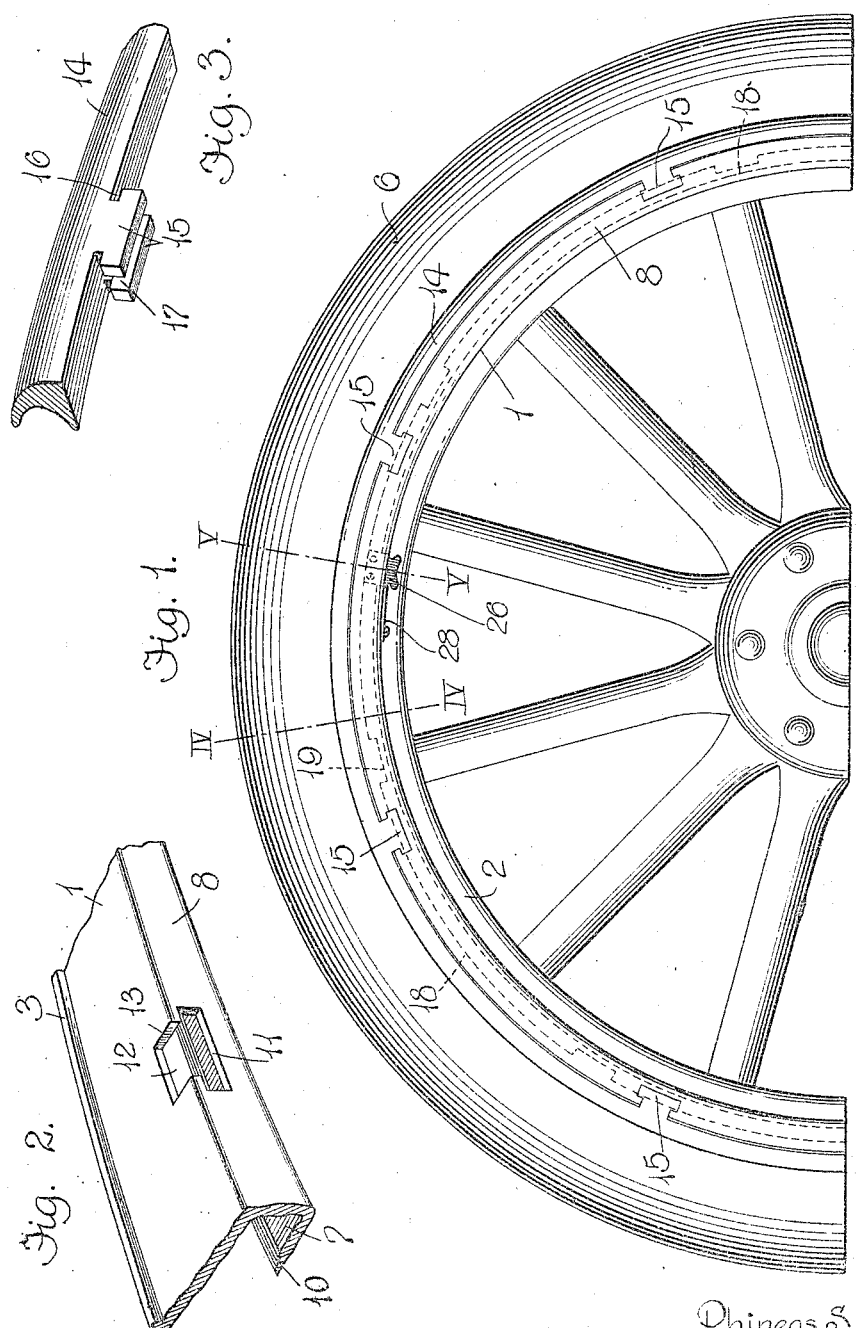

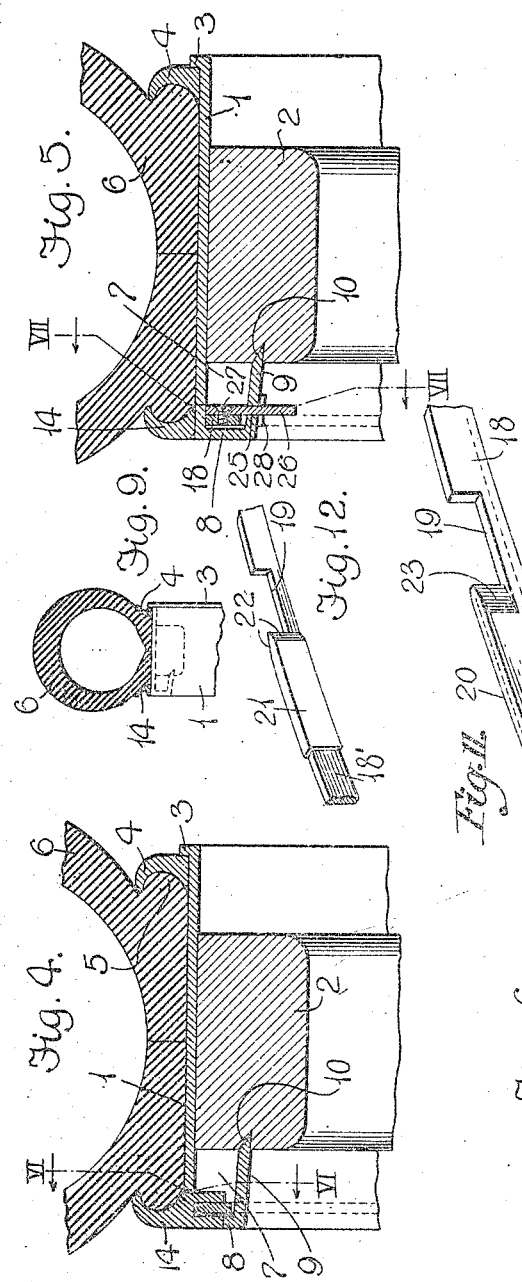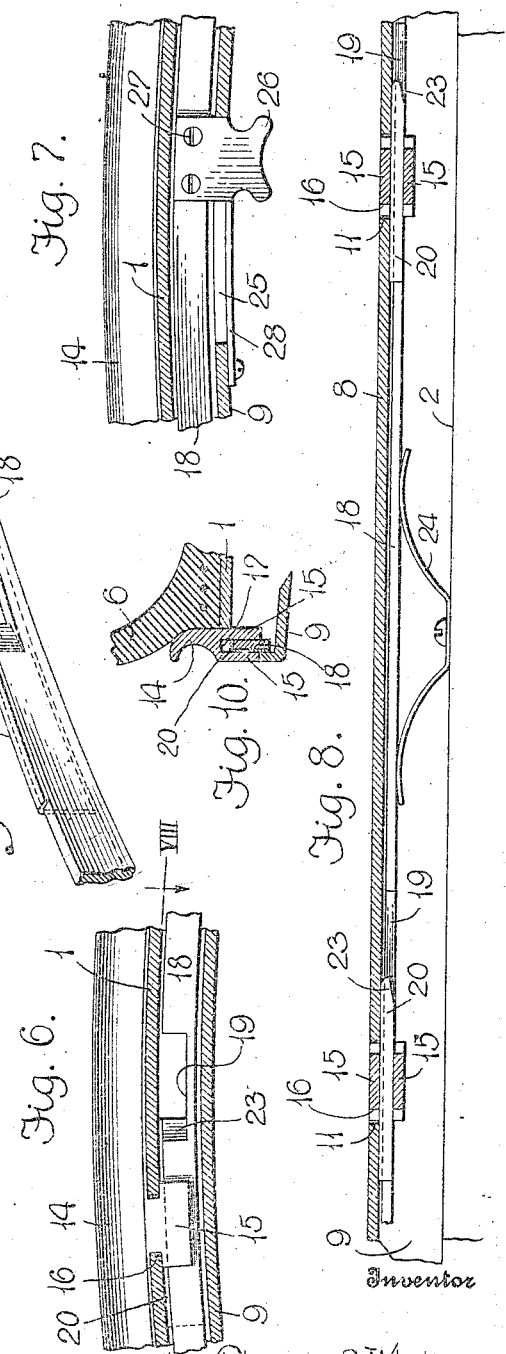

PHINEAS S. WHITING, OF AKRON, OHIO, ASSIGNOR TO MARIA E. WHITING, OF WAYNE COUNTY, MICHIGAN.

RIM FOR VEHICLE-WHEELS.

1,163,577.      Specification of Letters Patent.      Patented Dec. 7, 1915.

Application filed November 2, 1914. Serial No. 869,819.

*To all whom it may concern:*

Be it known that I, PHINEAS S. WHITING, a citizen of the United States of America, residing at Akron, in the county of Summit and State of Ohio, have invented certain new and useful Improvements in Rims for Vehicle-Wheels, of which the following is a specification, reference being had therein to the accompanying drawings.

This invention relates to rims for vehicle wheels, and more particularly to that type of rim known to the trade as "quick detachable" in contradistinction to demountable rims.

The primary object of my invention is to provide positive and reliable means, in a manner as hereinafter set forth, for detachably securing a tire casing or shoe to a rim, whereby the tire casing can be placed in position or removed without resorting to the use of implements or tools, the operation being expeditiously performed with the hands.

Another object of this invention is to furnish a wheel with a novel rim embodying simple and effective means whereby a tire casing having clenchers, straight beaded or otherwise shaped edges can be firmly held upon the rim without any danger of displacement.

A further object of this invention is to provide tire holding means embodying clamping members and an anti-frictional locking ring adapted to interlock said members whereby lateral or vertical displacement is practically impossible, said member having a shape that houses or conceals the locking ring and thereby prevents dirt and foreign matter from impairing the locking feature of the tire holding members.

In the general make up of the rim, the parts are constructed with a view of reducing the cost of manufacture, and at the same time retain the features by which safety, durability, simplicity and ease of fabrication are secured, and with such ends in view my invention resides in the novel construction, combination and arrangement of parts to be hereinafter specifically described and then claimed.

Reference will now be had to the drawings, wherein—

Figure 1 is a side elevation of a portion of a vehicle wheel provided with a rim in accordance with this invention; Fig. 2 is a perspective view of a portion of the rim proper; Fig. 3 is a perspective view of a portion of a clamping member; Fig. 4 is an enlarged cross sectional view taken on the line IV—IV of Fig. 1; Fig. 5 is a similar view taken on the line V—V of Fig. 1; Fig. 6 is a longitudinal sectional view taken on the line VI—VI of Fig. 4; Fig. 7 is a similar view taken on the line VII—VII of Fig. 5; Fig. 8 is a horizontal sectional view taken on the line VIII—VIII of Fig. 6; Fig. 9 is a cross sectional view of a tire casing having straight edges held by a rim; Fig. 10 is an enlarged cross sectional view of a portion of the same, illustrating a reversible clamping member; Fig. 11 is a perspective view of a portion of a locking ring; and Fig. 12 is a similar view of a modified form of ring.

In describing my invention by aid of the above views, I desire to point out that I intend the same as merely illustrative of an example whereby my invention may be applied in practice, and I do not care to confine myself to the precise construction and arrangement of parts shown. The following description is therefore to be broadly construed as including substitute constructions and arrangement of parts which are the obvious equivalent of those to be hereinafter referred to.

In the drawings, 1 denotes a felly member in the form of an annulus or band that is shrunk or otherwise mounted upon a wheel felly 2, said member being of a greater width than the felly whereby the side edges thereof project from the side of the felly. The inner side edge of the member 1 has a peripheral rib 3 against which is detachably seated an inner clamping member 4 adapted to engage the clencher edge 5 of a tire casing or shoe 6. The wall of the inner clamping member 4 is curved to conform to the clencher edge 5 of the tire casing and another wall of said member is shaped whereby said member can be reversed and used in connection with a tire casing having a straight edge, as best shown in Figs. 9 and 10. In some instances, where the type of the tire casing has been definitely decided, the inner clamping member 4 can be brazed or otherwise secured to the rib 3 of the member 1. The outer edge of the felly member 1 terminates in an inturned channel 7 having an annular wall 8 disposed at right angles to the member 1 and an annular wall or flange 9 disposed at an obtuse angle relative to the wall 8. The inner edge of the flange 9 is beveled or sharpened, as at 10 to readily enter the outer wall of the felly 2, as best shown in Fig. 4. The felly 2 closes the channel 7 and the inclination of the flange 9 relative to the felly is such as to deflect and drain water and foreign matter from the juncture of the flange and the felly. The wall 8 of the channel 7 is provided with a plurality of spaced longitudinally disposed slots 11 and communicating therewith are slots 12 in the outer edge of the felly member 1. The slots 12 are of a less length than the slots 11, thereby providing opposed ledges 13 for a purpose that will presently appear.

The outer edge of the felly member 1 affords an annular seat for an outer clamping member 14 which has the reversible features of the inner clamping member 4, said members coöperating in firmly holding the tire casing 6 upon the felly member. The outer clamping member 14, at points corresponding to the slots 11 and 12 has sets of parallel lugs 15 inverted T shaped in elevation and radially disposed relative to the axis of the outer clamping member. The shape and disposition of the lugs 15 is such as to form notches 16 and it is these notches that receive the ledges 13 of the felly member 1, thereby preventing radial displacement of the outer clamping member. By reference to Figs. 1 and 4, it will be observed that the outermost lugs 15 completely fill the slots 11, when the outer clamping member 14 is in position, thereby preventing dirt and foreign matter from entering the channel 7.

Housed within the channel 7 and shiftable circumferentially thereof is a locking ring 18, said ring being movable in the slots 17 and of a less width than said slots, whereby the locking ring can be easily shifted, as will presently appear. The locking ring has the periphery thereof provided with spaced recesses 19 providing clearance for the innermost lugs 15 as the outer clamping member is placed upon the felly member. Adjacent an end wall of each recess of the locking ring and upon the outer side thereof is an enlargement 20, serving two purposes. First, the enlargements engage the inner side of the wall 8 and maintain the locking ring 18 out of frictional contact with said wall, thereby reducing wear and tear upon the locking ring to a minimum and by reason of the small frictional contact with the wall permitting of the locking ring being easily and quickly shifted within the channel 7. In other words, the locking ring has just sufficient contact to guide it in its movement, otherwise the friction between the wall 8 and the locking ring would be such as to involve a laborious task when shifting the ring. Second, the enlargements 20 coöperate with the body of the locking ring 18 in completely filling the slots 17 and besides preventing withdrawal of the outer clamping member 14, said member is prevented from rattling or shifting upon the felly member 1.

The enlargements 20 as shown in Fig. 11, are preferably made of brass or an indurate material brazed or otherwise connected to the locking ring, which can be made of a less indurate material than the enlargements, thereby reducing the cost of manufacture. Should it be desirable, however, to make a locking ring 18' entirely of brass, as shown in Fig. 12, the enlargements 21 can be formed in any well known manner. In both instances, the enlargements have the ends thereof beveled, as at 22 and the end wall of the recess 19, contiguous to the enlargement 20, is beveled as at 23, such beveled edges allowing the enlargements to easily ride into the slots 17 and between the lugs 15. To hold the locking ring 18 with the enlargements 20 thereof against the inner side of the wall 8 and thus prevent rattling or lateral movement of the locking ring within the channel 7, the outer side of the felly 2, within the channel, has a plurality of resilient members 24, preferably in the form of flat springs having the ends thereof bearing against the locking ring 18, as best shown in Fig. 8.

In order that the locking ring 18, can be manually shifted, without resorting to the use of special tools, the flange 9 has a longitudinal slot 25 and extending through said slot is a hand piece 26, which is secured to the inner side of the locking ring 18 by screws 27 or other fastening means. The end walls of the slot 25 limit the movement of the hand piece 26 therein and consequently the shifting of the locking ring 18, and by moving the hand piece from one end of the slot 25 to the opposite end the enlargements 20 of the locking ring are either moved into the slots 17 or out of the slots, so it is through the medium of the resilient members 24 and the hand piece 26 that the enlargements 20 of the locking ring 18 are always maintained in proximity to the slots 11 and 12 to enter the slot 17 when the lugs 15 are placed in position.

Pivotally or otherwise connected to the wall 8 of the channel 7 is a keeper 28 that can be positioned over the slot 25 to close the same and prevent mud or other matter from clogging the slot and interfering with an adjustment of the hand piece 26. The keeper 28 also engages the hand piece 26 and retains the locking ring 18 in a locked position, thereby preventing any movement of the vehicle wheel from accidentally shifting the locking ring. The locking ring is also prevented from shifting by an inflated tire, as pressure on the outer clamping member causes the innermost lugs 15 to bend the locking ring against the wall 8 of the channel.

I attach considerable importance to the fact that the tire holding means can be manipulated by the hands without the use of a tool, and that after the locking ring has been shifted to a locked position, it is impossible for the outer clamping member 14 to become accidentally displaced. With the outer clamping member interlocked with the felly member, these two members possess practically the same rigidity as though integral, and by making the inner and outer clamping members reversible, tire casings or shoes of different type can be mounted upon the rim.

What I claim is:—

1. A tire holding means comprising a felly member, adapted for mounting on a felly to coöperate with an uninterrupted side wall thereof in forming a channel at the outer edge thereof, a clamping member on said felly member, sets of lugs carried by said clamping member and extending into said channel and engaging under said felly member, and means movable in said channel and between said lugs for locking said lugs therein.

2. A rim of the type described comprising a felly member, inner and outer reversible clamping members on said felly member, a channel carried by the outer edge of said felly member, lugs carried by the outer clamping member and extending into said channel, and means shiftable circumferentially of said channel for locking said lugs therein.

3. A rim of the type described, comprising a felly member, inner and outer reversible clamping members carried thereby, a channel at the outer edge of said felly member, sets of parallel lugs carried by the outer clamping member and interlocked with said channel, a locking ring in said channel movable between the lugs of each set, and means for locking the said ring in a locked position.

4. A rim of the type described, comprising a felly-member, inner and outer clamping members detachably mounted thereon, a channel at the outer edge of said felly member, sets of parallel lugs carried by the outer clamping member and interlocked with said channel, a locking ring movable within said channel and between the lugs of each set, enlargements on said ring adapted to engage said lugs and prevent accidental displacement of said lugs relative to said channel, and means within said channel for maintaining said ring in proximity to the wall thereof.

5. In a vehicle wheel, the combination with a felly, a felly member thereon and a tire casing adapted to be clamped upon said felly member, of inner and outer clamping members carried by said felly member and engaging said tire casing, a channel at the outer edge of said felly member and having an inclined annular flange engaging in said felly, and means movable in said channel for locking said outer clamping member on said felly member.

6. In a vehicle wheel, the combination with a felly, a felly member thereon adapted to support a tire casing, and inner and outer clamping members on said felly member, of a channel at the outer edge of said felly member and having the flange thereof engaging in said felly, sets of parallel inverted T shaped lugs interlocked with said channel and retaining said outer clamping member on said felly member, a locking ring in said channel having recesses providing clearance for said lugs, and means at the flange of said channel whereby said ring can be shifted to positively lock said lugs in said channel.

In testimony whereof I affix my signature in presence of two witnesses.

PHINEAS S. WHITING.

Witnesses:
 ANNA M. DORR,
 KARL H. BUTLER.